US012639204B2

(12) United States Patent
Panikkar

(10) Patent No.: US 12,639,204 B2
(45) Date of Patent: May 26, 2026

(54) MEMORY-AWARE INPUT BATCH PROCESSING FOR LARGE LANGUAGE MODELS

(71) Applicant: Dell Products L.P., Round Rock, TX (US)

(72) Inventor: Shibi Panikkar, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 22 days.

(21) Appl. No.: 18/952,363

(22) Filed: Nov. 19, 2024

(65) Prior Publication Data

US 2026/0140865 A1     May 21, 2026

(51) Int. Cl.
| | |
|---|---|
| *G06F 12/00* | (2006.01) |
| *G06F 9/48* | (2006.01) |
| *G06F 9/50* | (2006.01) |
| *G06F 11/30* | (2006.01) |
| *G06F 12/02* | (2006.01) |
| *G06N 3/0455* | (2023.01) |
| *G06N 20/00* | (2019.01) |

(52) U.S. Cl.
CPC .......... *G06F 12/023* (2013.01); *G06F 9/4881* (2013.01); *G06F 9/5016* (2013.01); *G06F 11/3037* (2013.01); *G06N 3/0455* (2023.01); *G06N 20/00* (2019.01)

(58) Field of Classification Search
CPC .. G06F 9/5016; G06F 9/4881; G06F 11/3037; G06N 20/00
See application file for complete search history.

(56) References Cited

U.S. PATENT DOCUMENTS

| | | | |
|---|---|---|---|
| 10,846,096 B1* | 11/2020 | Chung | G06F 9/3856 |
| 11,514,370 B1* | 11/2022 | Yu | G06N 3/063 |
| 2017/0212698 A1* | 7/2017 | Bhadauria | G06F 12/0888 |
| 2021/0191879 A1* | 6/2021 | Arora | G06F 12/0877 |
| 2022/0066821 A1* | 3/2022 | Pinto | G06F 9/4881 |

* cited by examiner

*Primary Examiner* — Daniel D Tsui
(74) *Attorney, Agent, or Firm* — Amin, Turocy & Watson, LLP

(57) ABSTRACT

A method facilitating memory-aware input batch processing for large language models includes monitoring, by a system including at least one processor, an amount of memory, utilized by a process in execution by a language model in association with processing a first batch of prompts, relative to an available amount of memory for the process in execution; in response to determining that the amount of memory utilized by the process in execution is at least a threshold proportion of the available amount of memory, removing, by the system, at least one prompt from the first batch of prompts according to a priority criterion, resulting in a second batch of prompts; and facilitating, by the system in response to the removing, restarting the process in execution with the second batch of prompts instead of the first batch of prompts.

20 Claims, 14 Drawing Sheets

300

302 Set memory threshold

304 Batch incoming requests

306 Prioritize requests in batch

308 Process batch

To Fig. 4

310 Memory above threshold?

Y

314 Start batch refinement process

N

312 Complete request(s)

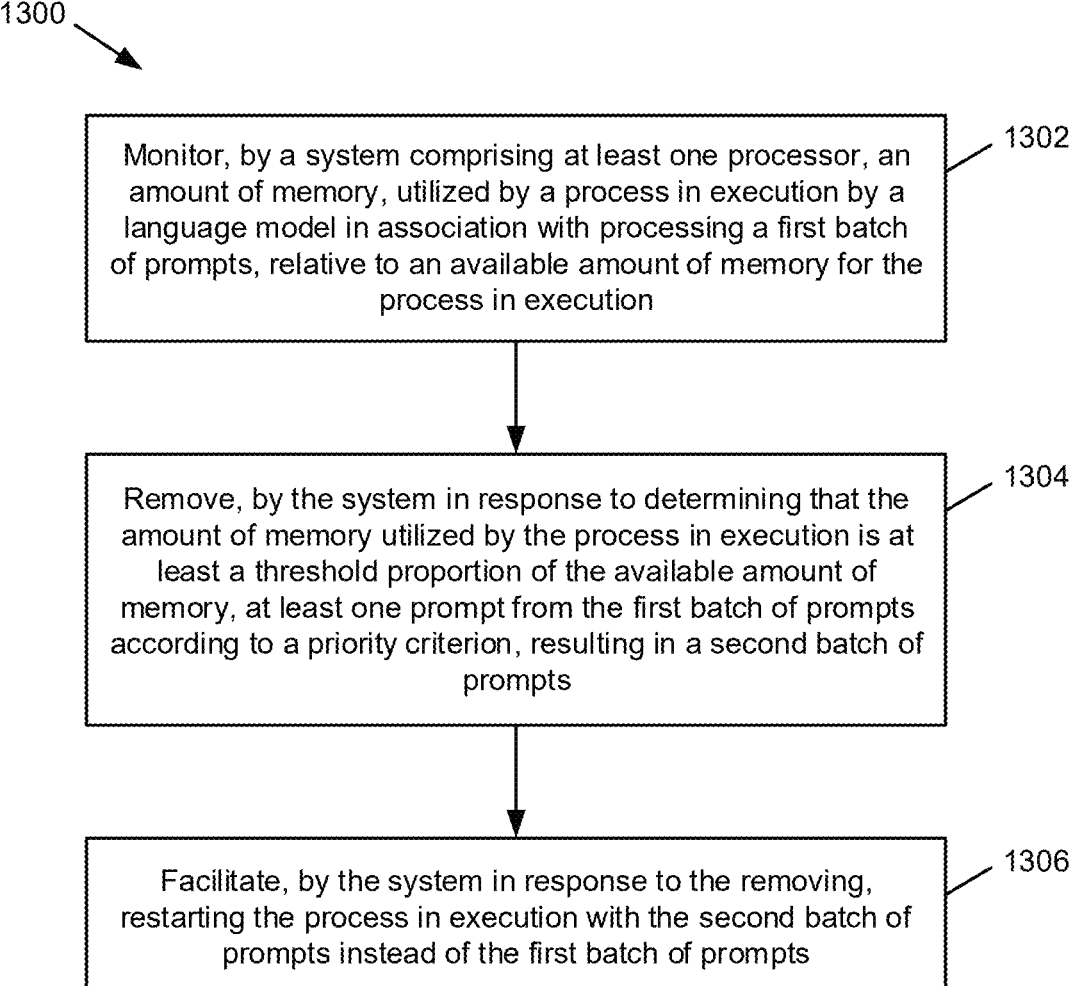

1300

Monitor, by a system comprising at least one processor, an amount of memory, utilized by a process in execution by a language model in association with processing a first batch of prompts, relative to an available amount of memory for the process in execution — 1302

Remove, by the system in response to determining that the amount of memory utilized by the process in execution is at least a threshold proportion of the available amount of memory, at least one prompt from the first batch of prompts according to a priority criterion, resulting in a second batch of prompts — 1304

Facilitate, by the system in response to the removing, restarting the process in execution with the second batch of prompts instead of the first batch of prompts — 1306

FIG. 13

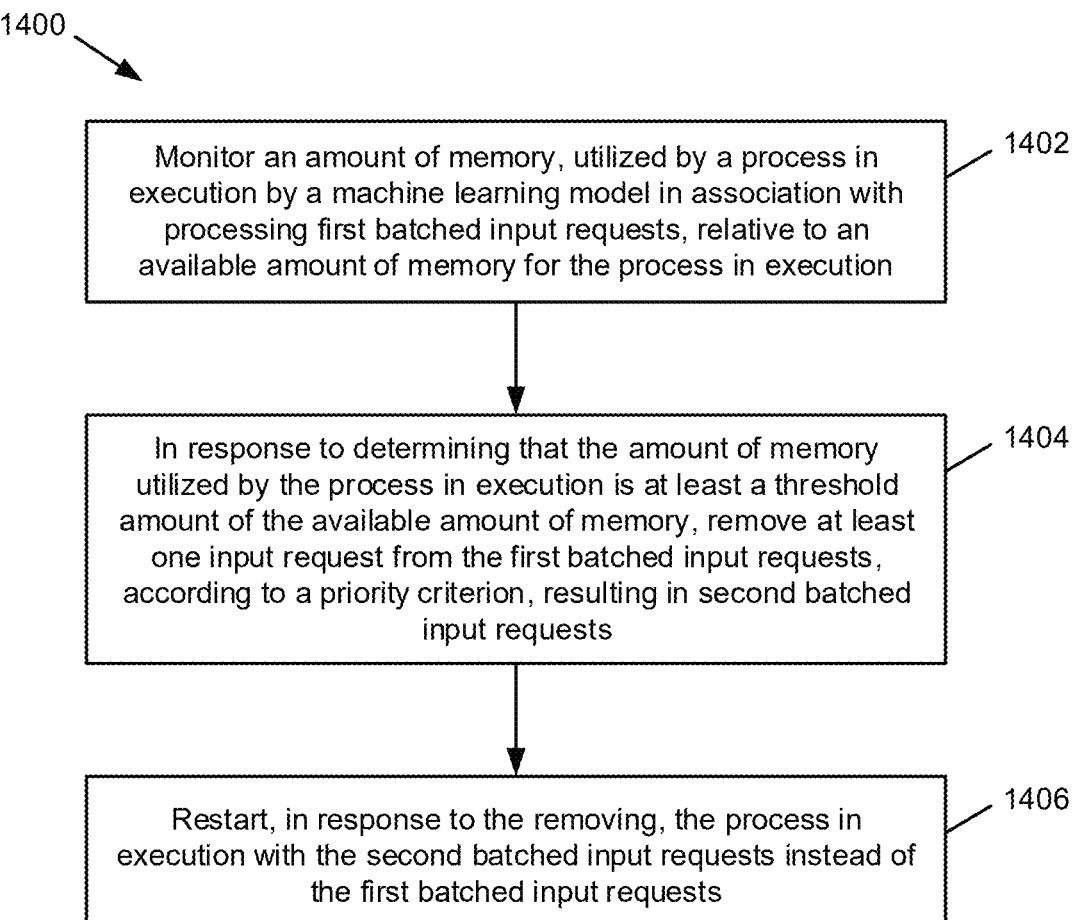

1400

Monitor an amount of memory, utilized by a process in execution by a machine learning model in association with processing first batched input requests, relative to an available amount of memory for the process in execution — 1402

In response to determining that the amount of memory utilized by the process in execution is at least a threshold amount of the available amount of memory, remove at least one input request from the first batched input requests, according to a priority criterion, resulting in second batched input requests — 1404

Restart, in response to the removing, the process in execution with the second batched input requests instead of the first batched input requests — 1406

FIG. 14

MEMORY-AWARE INPUT BATCH PROCESSING FOR LARGE LANGUAGE MODELS

BACKGROUND

A large language model (LLM) is a type of machine learning model that can utilize a large network of parameters to transform an input prompt (question, request) into a text output. For LLMs that process a high volume of input requests, batch processing is a powerful technique that can be used to facilitate efficient handling of large sets of data by grouping requests and processing them in bulk. Such an approach can significantly reduce the number of individual interactions with an LLM models, resulting in improved resource utilization and reduced latency. However, memory usage can become a limiting factor in batch processing, especially when working with complex LLMs. For instance, as input batches grow larger, the associated memory consumption increases, which can potentially lead to processing of a given batch failing due to out-of-memory errors.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include monitoring an amount of memory, utilized by a process in execution by a large language model in association with processing a first batch of input requests, relative to an available amount of memory for the process in execution. The operations can further include, in response to determining that the amount of memory utilized by the process in execution is at least a threshold percentage of the available amount of memory, removing at least one input request from the first batch of input requests according to a priority criterion, resulting in a second batch of input requests. The operations can additionally include restarting, in response to the removing, the process in execution with the second batch of input requests instead of the first batch of input requests.

In another implementation, a method is described herein. The method can include monitoring, by a system including at least one processor, an amount of memory, utilized by a process in execution by a language model in association with processing a first batch of prompts, relative to an available amount of memory for the process in execution. In response to determining that the amount of memory utilized by the process in execution is at least a threshold proportion of the available amount of memory, the method can include removing, by the system, at least one prompt from the first batch of prompts according to a priority criterion, resulting in a second batch of prompts. The method can also include facilitating, by the system in response to the removing, restarting the process in execution with the second batch of prompts instead of the first batch of prompts.

In an additional implementation, a non-transitory machine-readable medium is described herein that can include instructions that, when executed by at least one processor, facilitate performance of operations. The operations can include monitoring an amount of memory, utilized by a process in execution by a machine learning model in association with processing first batched input requests, relative to an available amount of memory for the process in execution; in response to determining that the amount of memory utilized by the process in execution is at least a threshold amount of the available amount of memory, removing at least one input request from the first batched input requests, according to a priority criterion, resulting in second batched input requests; and restarting, in response to the removing, the process in execution with the second batched input requests instead of the first batched input requests.

DESCRIPTION OF DRAWINGS

Various non-limiting embodiments of the subject disclosure are described with reference to the following figures, wherein like reference numerals refer to like parts throughout unless otherwise specified.

FIGS. 13-14 are flow diagrams of respective additional methods that facilitate memory-aware input batch processing for large language models in accordance with various implementations described herein.

DETAILED DESCRIPTION

Figure 1:
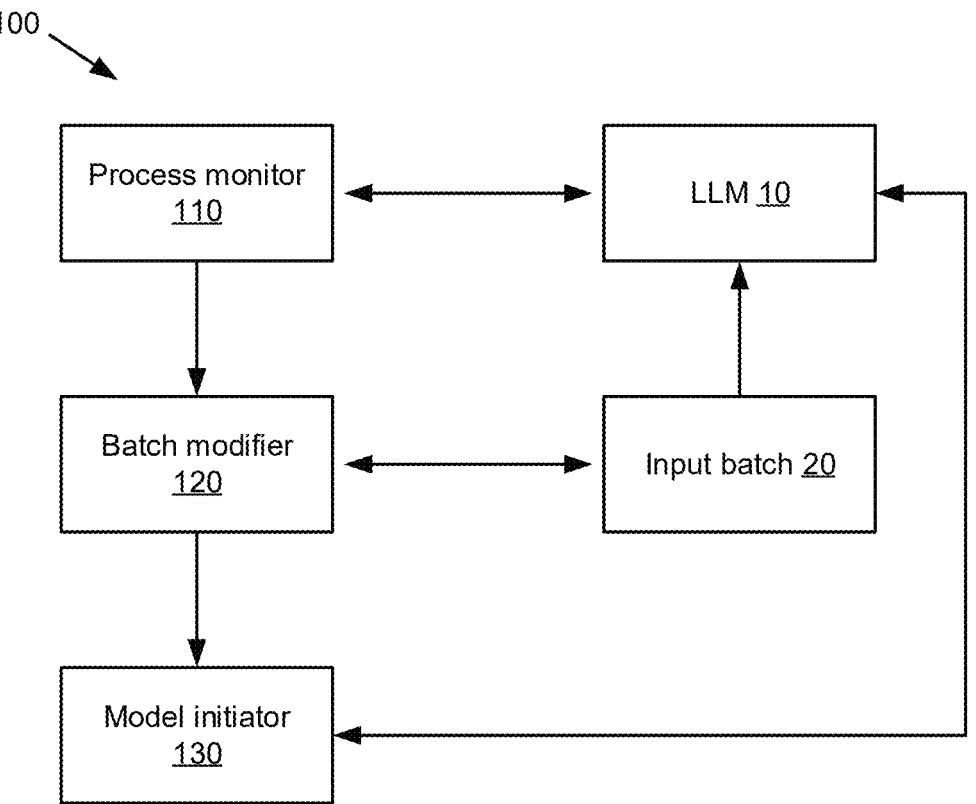
FIG. 1 is a block diagram of a system that facilitates memory-aware input batch processing for large language models in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

As noted above, batch processing can be a powerful technique for efficiently handling large input datasets for a large language model (LLM) by grouping requests and processing them in bulk. However, memory can become a limiting factor in batch processing, especially when working with complex LLMs. As a result, effective memory management techniques are desirable for successful batch processing. By way of example, techniques like efficient tokenization, context management, and the strategic use of key-value (KV) caching can be used to minimize memory footprint and prevent performance bottlenecks. By optimizing memory usage, batch processing can unlock the full potential of LLMs, enabling them to handle large amounts of data with speed and accuracy.

Even though larger batch sizes yield better efficiency, current batch processing techniques often utilize batches of a predefined size due to memory limitations. By way of example, requests in a batch can be tokenized, padded (to make each request equal in length), and sequenced in a KV cache before passing the batch to an LLM for parallel processing. However, if the batch size is larger than the amount of memory allocated by the LLM for the batch, the system can encounter an out-of-memory error and crash all requests in the batch. Due to the difficulty in determining optimal batch sizes, e.g., resulting from output sequences being non-deterministic in LLM processes, conventional LLM input batches are typically constructed conservatively to avoid memory limitations. However, the use of batches that are smaller than the size allocated to them by the LLM can result in underutilization of the memory.

To the furtherance of the above and/or related ends, implementations described herein can provide techniques to enable a system to intelligently process optimally sized batches of LLM input requests. For instance, implementations provided herein can facilitate intelligent tokenization and prioritization within a given input batch, enabling more efficient use of LLM memory limitations as well as allowing for prompt processing of high-priority input requests, e.g., via a priority tagging system as will be described in further detail below with reference to FIG. 6. Additionally, implementations provided herein can facilitate a batch refinement method, e.g., as will be described in further detail below with reference to FIG. 4, that can monitor the memory usage of an LLM process and take actions to modify an input batch when the system crosses a memory consumption threshold.

By utilizing one or more implementations as described herein, the performance of a computing system that implements and/or otherwise interacts with an LLM or other similar machine learning model can be improved by, e.g., reducing the incidence of model crashes or errors due to exceeding input memory limitations while also reducing model memory underutilization caused by overly conservative batching. In addition, the overall user experience associated with using an LLM and/or systems that interact with an LLM, such as systems that provide customer service, sales support, user account assistance, or the like, can be improved by intelligently prioritizing and executing user queries to reduce wait times for responses to high-priority questions or, in some cases, scenarios in which a high-priority request times out completely and requires re-entry. Further, it is noted that implementations described herein can provide solutions to technical problems that are inextricably tied to computer systems, such as monitoring and constraining the amount of memory used by a computing process to ensure the continued proper operation of that process, in addition to providing those solutions in a manner that cannot reliably be performed by humans. For instance, due to the speed at which a computer processes data, the amount of data that can be processed by a computer in parallel, the rate at which resource usage of a computer can fluctuate during execution of a process, and/or other factors, it is not possible for a human to monitor the amount of memory used by a given process in execution by a computing system, or to direct the performance of actions to be taken in real time in response to that monitoring, at the timescale in which the process is executed.

With reference now to the drawings, FIG. 1 illustrates a block diagram of a system 100 that facilitates memory-aware input batch processing for LLMs in accordance with various implementations described herein. System 100 as shown in FIG. 1 includes executable components, e.g., a process monitor 110, a batch modifier 120, and a model initiator 130, each of which can operate as described in further detail below. In an implementation, the components 110, 120, 130 of system 100 can be implemented in hardware, software, or a combination of hardware and software. By way of example, the components 110, 120, 130 can be stored on at least one memory and executed by at least one processor. An example of a computer architecture including a processor and memory that can be used to implement the components 110, 120, 130, as well as other components as will be described herein, is shown and described in further detail below with respect to FIG. 15. In some implementations, the executable components 110, 120, 130 of system 100, and/or other elements of system 100, can communicate with each other via a bus and/or other components that provide intercommunication between various elements of system 100.

Additionally, it is noted that the functionality of the respective components shown and described herein can be implemented via a single computing device and/or a combination of devices. For instance, in various implementations, the process monitor 110 shown in FIG. 1 could be implemented via a first device, the batch modifier 120 could be implemented via the first device or a second device, and the model initiator 130 could be implemented via the first device, the second device, or a third device. Also, or alternatively, the functionality of a single component could be divided among multiple devices in some implementations.

As will be described in further detail below, the components 110, 120, 130 of system 100 can be utilized to interact with an LLM 10 and/or a batch 20 of inputs (prompts, requests, questions, etc.) to be provided to the LLM 10. In some implementations, one or more of the components 110, 120, 130 of system 100 can be implemented on the same computing device(s) on which the LLM 10 resides. In other implementations, the LLM 10 can be separate from system 100, and the components 110, 120, 130 of system 100 can interact with the LLM 10 and respective batches 20 to be provided as input to the LLM 10 via any suitable wired or wireless communication technology or combination of technologies. In some implementations described herein, the LLM 10 can be a pre-trained model that operates independently from system 100 such that the components 110, 120, 130 of system 100 do not have direct control over the operation of the LLM 10 outside of the ability to form input batches 20 to the LLM 10 or to start and/or stop processes in execution by the LLM 10 for those input batches 20 as described herein. In other implementations, system 100 as shown in FIG. 1 could be implemented within the LLM 10 itself. Additionally, with respect to the description that follows, it is noted that any specific reference to particular models or model types are provided merely as examples and are not intended to be limiting on the LLM 10 as described herein, or the description or the claimed subject matter more generally, unless explicitly stated otherwise.

With reference now to the components of system 100, the process monitor 110 can monitor an amount of memory, utilized by a process in execution by an LLM 10 in association with processing a batch 20 of input requests, relative to an available amount of memory for the process in execution. In some implementations, the available amount of memory can be a physical amount of memory available to one or more computing machines on which the LLM 10 is executed, such that exceeding the available memory would result in direct malfunction of those machine(s). In other implementations, the available amount of memory can be an amount of memory that is allocated to a given batch processing task by the LLM 10, such that exceeding the allocated amount of memory results in the LLM 10 returning an error or otherwise refusing to complete processing of the task.

In response to the process monitor 110 determining that the amount of memory used by the process in execution by the LLM 10 is at least a threshold proportion (percentage, ratio, etc.) of the available amount of memory for the process, the batch modifier 120 can remove at least one input request from the batch 20, e.g., according to a priority criterion such as that which will be described below with reference to FIG. 6. In response to the removal of one or more inputs requests from the batch 20, the model initiator 130 can then restart the process at the LLM 10 with the batch 20 of input requests as modified by the batch modifier 120, i.e., instead of the original batch 20.

System 100 as described above can be utilized to provide improved memory management for implementations of an LLM. Even in the case of large enterprise systems (e.g., systems running in a private cloud and/or at data centers), there are constraints on the amount of resources, such as memory usage, that can be allocated to a specific application such as an LLM. As a result, conventional LLM input batch sizing techniques are forced to engage in tradeoffs between the potential for performance issues and underutilization of memory. For instance, increased batch sizes (referred to herein as "pessimistic" batch sizing) will often result in an LLM returning out-of-memory exceptions. On the other hand, smaller, conservative batch sizes (referred to herein as "optimistic" batch sizing) lead to more batches and larger sequences of batches, which in turn can result in underutilized resources and poor performance. For instance, if 15 requests for an LLM are present at a given time and the maximum batch size is set to 3, 15/3=5 batches will be formed and sequenced when potentially fewer batches could be used.

Figure 2:
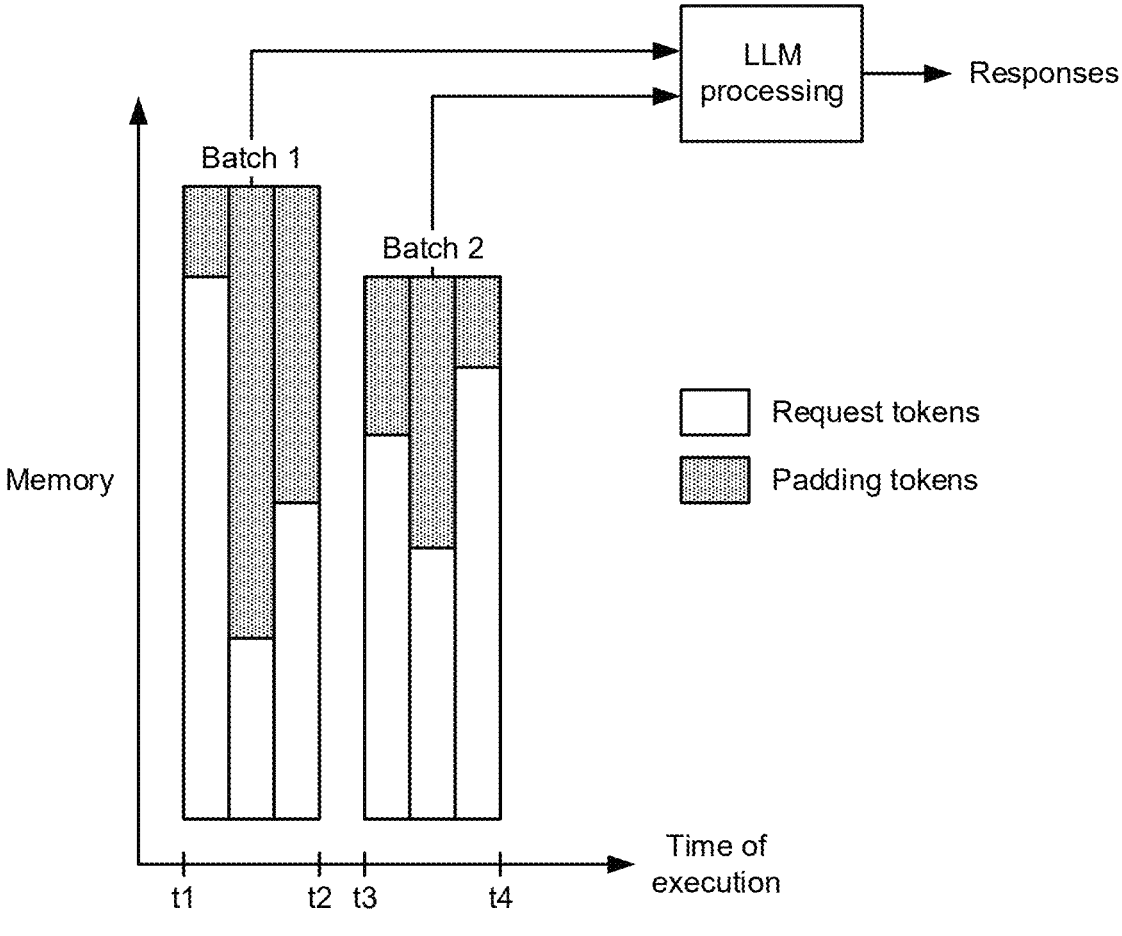
FIG. 2 is a diagram illustrating example batch processing operations that can be performed in accordance with various implementations described herein.

Additionally, as shown by FIG. 2, requests in a batch can often have different sequence lengths, which can necessitate the introduction of padding that consumes additional memory, e.g., in an implementation in which an LLM requires that batched requests are structured in a manner in which all requests in a batch are the same length. Additionally, even the longest request in a given batch may necessitate a designated minimum amount of padding tokens, e.g., as shown in FIG. 2, in the event that an LLM needs padding between all requests to distinguish between requests and/or for other purposes. While these padding tokens are not computed by the LLM, they can still contribute toward the total amount of memory associated with a given batch. In some cases, padding tokens can contribute significantly toward the total memory footprint of a given patch. For instance, if one request in a batch has 4000 tokens and another request has only 100 tokens, at least 3900 padding tokens will be applied to the latter request, resulting in suboptimal use of memory.

In the specific example shown by FIG. 2, batches are structured for LLM processing into batch sizes of three requests. As shown, the first batch can be padded relative to its longest request, in response to which execution of the batch by the LLM can begin at time t1 and end at time t2. The second batch can similarly be padded relative to its longest request and queued until completion of the first batch. Subsequently, the second batch can be executed by the LLM beginning at time t3 and ending at time t4. If the two batches shown in FIG. 2 are combined into a single batch of six requests, it is possible that the LLM could return an out of memory exception causing processing of the combined batch to fail.

To mitigate the issues associated with both undersizing and oversizing input batches, implementations described herein can facilitate optimization techniques for LLM batch processing that can allow larger sizes of batches as well as allow for prioritized processing of requests. These techniques can include, but are not limited to, priority tagging of requests in a batch based on context (e.g., as described below with reference to FIG. 6), dynamic attention score pruning based on context (e.g., as described below with reference to FIG. 7), pad-less caching and re-padding (e.g., as described below with reference to FIGS. 9-10), and request batch refinement triggered by memory consumption exceeding a threshold (e.g., as described below with reference to FIGS. 3-4 and 12).

Figure 3:
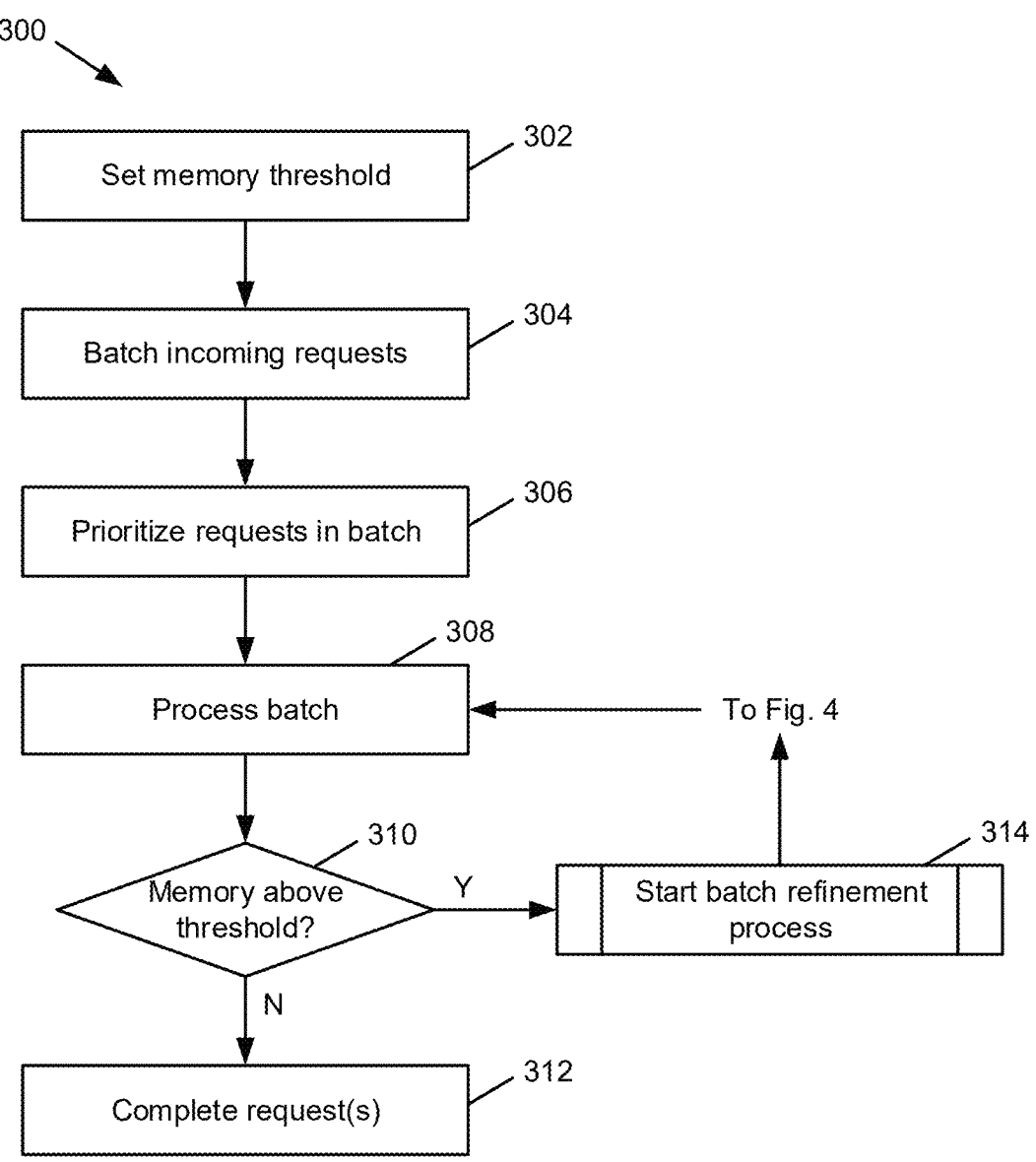
FIGS. 3-4 are flow diagrams of respective methods that facilitate memory-aware input batch processing for large language models in accordance with various implementations described herein.

Turning now to FIG. 3, a flow diagram of a method 300 that facilitates memory-aware processing of an LLM input batch is illustrated. The method 300 can begin at 302, at which a memory threshold for which subsequent acts of method 300 can be triggered is set. In implementations, the memory threshold can be set at 302 by a system operator or other user, and/or automatically, as a percentage of a total amount of memory available to an LLM input batch based on a desired tradeoff between performance and reliability. For instance, the probability of an input batch failing due to exceeding allocated memory limits can be weighed against the performance considerations associated with performing batch refinement to arrive at a suitable memory threshold. In implementations, the threshold can be set between approximately 75-80 percent of the total available amount of memory, but it is noted that this can vary based on implementation.

At 304, incoming requests can be batched for subsequent LLM processing. In some implementations, all incoming requests can be assigned to a single batch at 304 to enable subsequent modification of the batch if necessary. In other implementations, a comparatively large (pessimistic) batch size can be used at 304, for instance, a batch size that is associated with a comparatively higher rate of batch overflow for the given model and model infrastructure in use than that associated with smaller (optimistic) batch sizes.

At 306, the requests in the batch(es) formed at 304 can be prioritized, e.g., based on intent, context, and/or other factors. An example technique that can be used for prioritizing requests at 306 is described below with reference to FIG. 6. Next, at 308, the input batch can be processed by an associated LLM. At 310, during processing of the batch at 308, the memory usage of the LLM in association with processing the batch can be continuously and/or periodically monitored to determine whether it has exceeded the memory threshold defined at 302. If the memory threshold is not exceeded, the requests can simply be completed at 312 and method 300 can conclude. Alternatively, in the event that the memory threshold is exceeded, method 300 can branch from 310 to 314 to begin a batch refinement and resizing process, which is shown via method 400 in FIG. 4.

Figure 4:
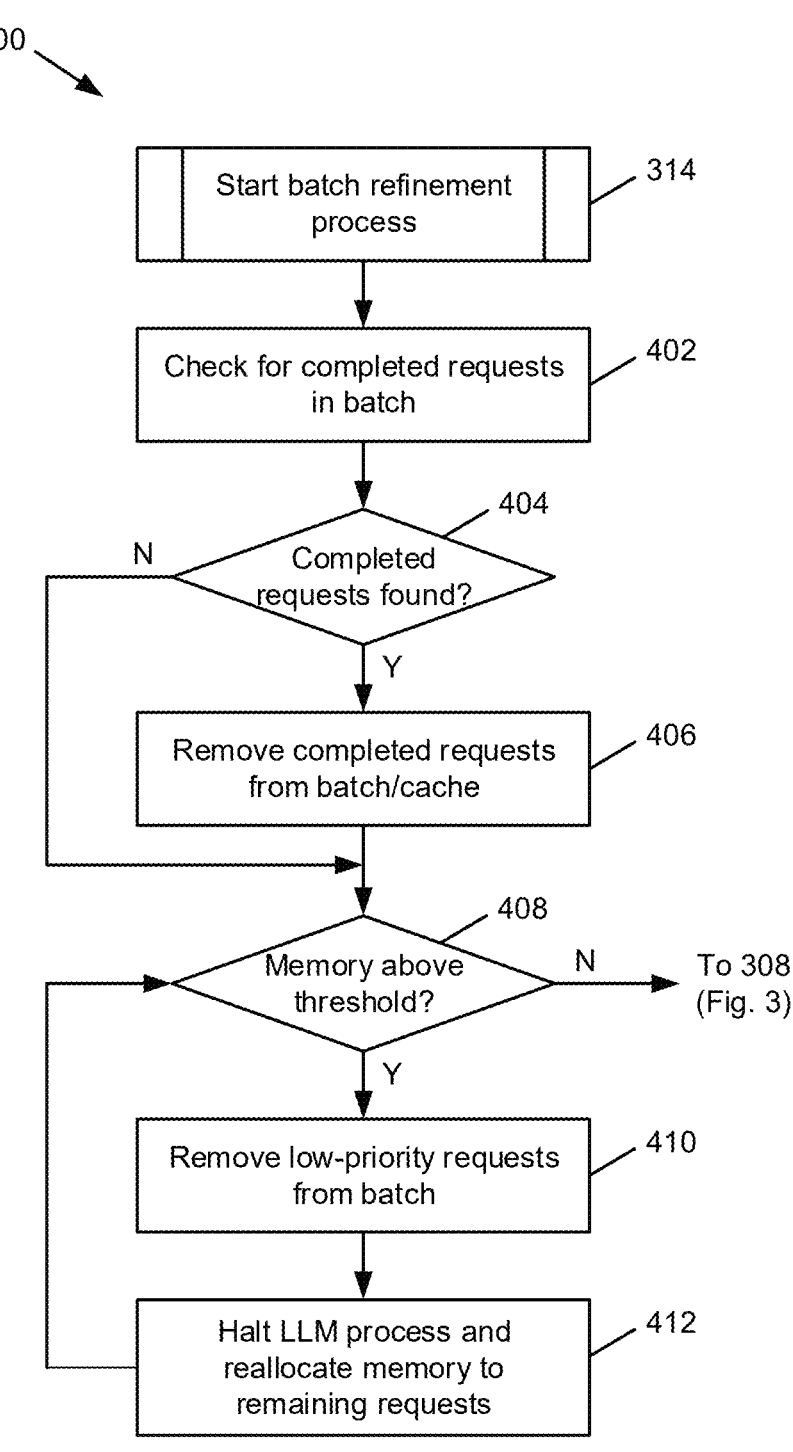

As shown via method 400 in FIG. 4, the batch refinement and resizing process can begin at 402 after being triggered via 314 as described above. At 402, the batch refinement and resizing process can initially check for any completed requests in the batch, i.e., any short sequenced processes that were already completed by the LLM prior to the memory usage of the LLM reaching the threshold as determined at 310 of method 300 as described above.

At 404, method 400 can branch based on the results of the check performed at 402. If completed requests were found at 402, method 400 can proceed from 404 to 406, at which the completed requests can be removed from the batch and any associated caches. The memory associated with the completed requests can then be released and reallocated for other pending requests in the batch.

If no completed requests are found at 404, or upon successfully removing any completed requests at 406, method 400 can proceed to 408 to determine whether the memory usage of the LLM process continues to exceed the threshold allocated at 302 in method 300 as described above. If the memory threshold is no longer exceeded, e.g., due to removal of completed requests causing the memory usage to fall below the threshold, flow can return from 408 to 308 of method 300 as described above in order to resume batch processing.

Alternatively, if it is determined at 408 at the memory threshold continues to be exceeded, method 400 can proceed from 408 to 410, at which respective low-priority requests can be removed from the batch, e.g., based on the prioritization of the requests in the batch as performed at 306 in method 300. In implementations, this can be a fixed number of requests, a relative number of requests (e.g., one third of the total batched requests, one quarter of the total batched requests, etc.), and/or any other suitable number of requests having the lowest priority values among the requests in the batch.

At 412, the LLM process associated with the input batch can then be halted (killed, stopped), and the memory associated with the requests removed from the batch at 410 can be reallocated to the remaining requests in the batch. Method 400 can then return to 408 to determine whether the actions taken at 410-412 have caused the memory usage of the LLM process to fall below the defined threshold, and the actions at 410-412 can be repeated as necessary if the memory usage still exceeds the threshold.

In the event that unprocessed requests are removed from an input batch, e.g., as shown at 410, the removed requests can be added to a subsequent input batch, along with any new requests that are queued during processing of the previous batch. Alternatively, in some implementations, a new batch can be created exclusively for the removed requests, e.g., to preserve the relative ordering of requests, based on the configuration of the system.

Figure 5:
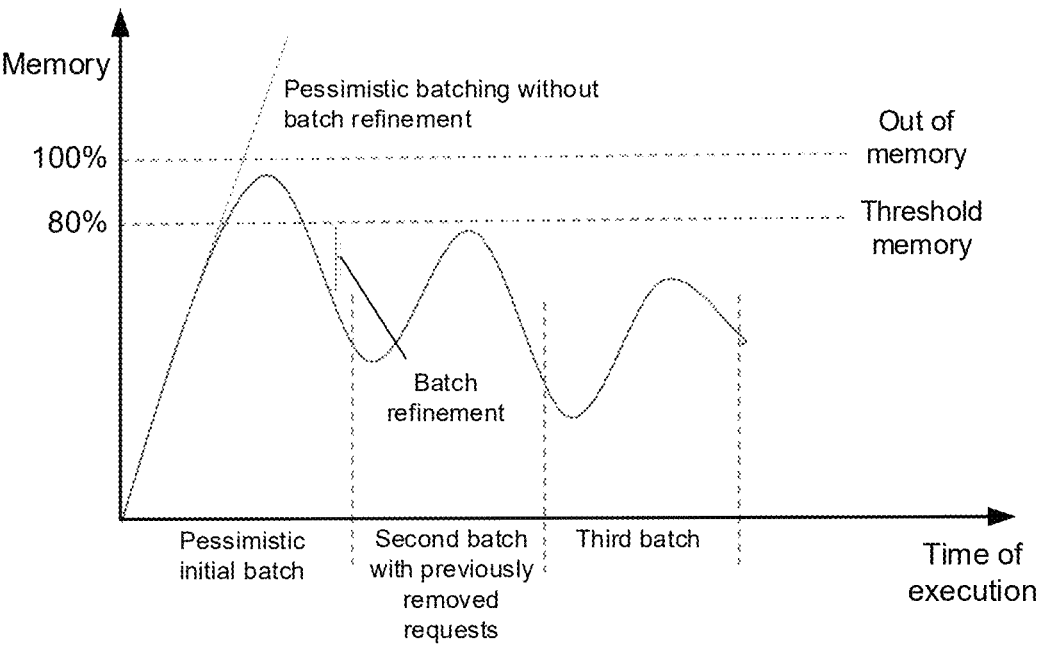
FIG. 5 is a diagram illustrating example language model memory usage that can be achieved using various implementations described herein.

Referring now to FIG. 5, a diagram that shows memory usage associated with an implementation of methods 300 and 400 for an example input batch is provided. As shown by FIG. 5, if pessimistic batching is used for the input batch, the memory usage associated with processing the initial pessimistic batch will quickly exceed the amount of memory allocated for the batch, resulting in out of memory errors. Instead, by performing batch refinement as described above with respect to FIG. 4, here based on a memory threshold of 80 percent of the total allocated memory, LLM memory usage can be kept within the amount of memory allocated to the batch even in the case of pessimistic batch sizing. As further shown by FIG. 5, any requests removed from the initial pessimistic batch can then be added to subsequent batches, enabling processing of each incoming request based on its relative priority as resources become available.

Figure 6:
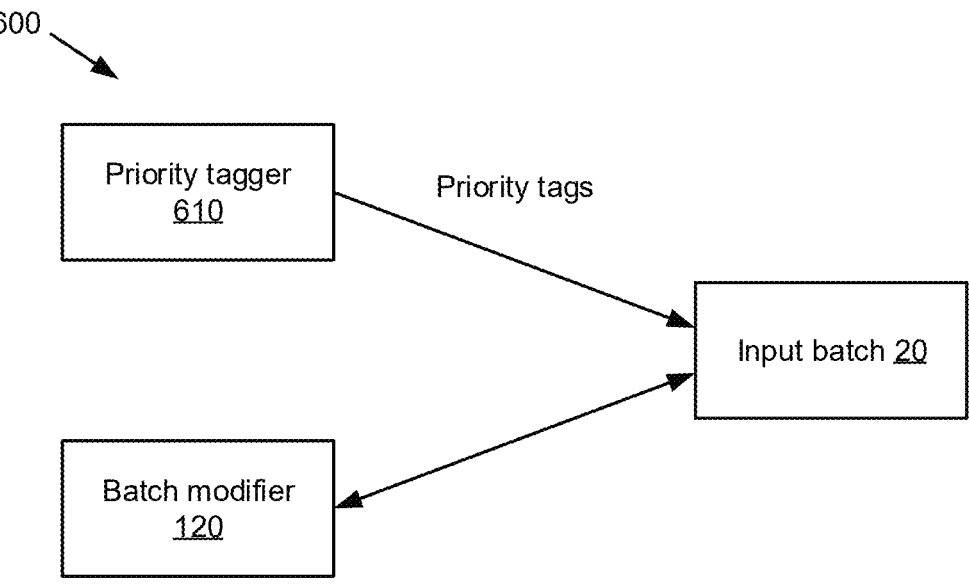
FIGS. 6-7 are block diagrams of additional systems that facilitate memory-aware input batch processing for large language models in accordance with various implementations described herein.

With reference now to FIG. 6, a block diagram of a system 600 that facilitates priority tagging of requests in an LLM input batch 20 is illustrated. Repetitive description of like parts described above with regard to other implementations is omitted for brevity. System 600 as shown in FIG. 6 includes a priority tagger 610, which can assign priority scores to input requests, e.g., requests of an input batch 20 to be provided to an LLM or other model. The priority scores assigned to the requests by the priority tagger 610 can then be utilized by the batch modifier 120 to determine, e.g., requests to be removed from the input batch 20 in connection with the batch refinement procedure described above with respect to FIG. 4, based on a priority analysis that includes comparing the priority scores of the respective requests to a threshold priority value.

As will be described in further detail below, the priority tagger 610 can also apply and/or utilize tags for respective requests based on factors such as originators of respective input requests, contexts of the input requests, and/or other factors. The priority tagger 610 can then utilize these tags to compute corresponding priority scores and/or for other purposes.

In an implementation, the priority tagger 610 can utilize a multidimensional analysis to determine the relative priorities of requests in an input batch 20. For instance, the priority of a given request can be based on the type of user that submitted the request, the originating point of the request (e.g., a website form, a customer portal, etc.), an intent of the request, or the like. In order to perform this multidimensional analysis in an expedient manner, the priority tagger 610 can utilize a matrix- and/or vector-based approach to resolve the highest ranking requests in a batch, e.g., to facilitate sorting the batch by priority.

By way of example, the priority tagger can define a two- (or more) dimensional rule vector that assigns numerical values to respective combinations of user type and request context. An example rule vector is provided in Table 1 below. It is noted that the size of the rule vector in Table 1 is intended merely for purposes of illustration and that the rule vector could be of any appropriate size, e.g., with any number of user types and/or contexts.

TABLE 1

| Example rule vector for query priority analysis. | | | | |
|---|---|---|---|---|
| | Context-1 | Context-2 | Context-3 | Context-4 |
| UserType-1 | 10 | 5 | 15 | 2 |
| UserType-2 | 5 | 8 | 20 | 3 |
| UserType-3 | 3 | 3 | 10 | 1 |

In the above example, the different user types can correspond to different classes of users, e.g., enterprise users, vendors, website visitors, etc., and this information can be determined based, at least in part, on the location from which a given query is received. For instance, the originator of a query received via an enterprise portal can be classified as an enterprise user, and so on. The different context types can correspond to different intents or contexts for queries, such as billing inquiries, customer support requests, purchasing or sales inquiries, etc. In some implementations, the context of a query can be determined via a natural language understanding (NLU) model, such as the Rasa model developed by Rasa Technologies GmbH and/or a specialized NLU model trained on a use-case-specific dataset, by mapping the language of a query to an intent. Other techniques for intent or context derivation could also be used.

Prior to determining priority scores for respective input requests, respective request vectors can be generated for each of the requests. The request vector for a given request can be, e.g., a 1×N matrix of 0s and 1s, where N is equal to the number of contexts present in the rule vector, and a 1 or 0 value in the request vector indicates that the context is, or is not, relevant to the corresponding context, respectively. For instance, with reference to Table 1 above, a request that is determined to relate to Context-1 and Context-3 could be associated with a request vector of [1 0 1 0], which is referred to below as R1.

In an implementation, the priority tagger 610 can then assign a scalar priority score to a given request based on a dot product of the request vector for that request and the rule vector. To facilitate this dot product, the request vector can also be expanded based on the user type associated with the request such that the request vector and the rule vector are of matching size. This can be done by, e.g., applying zero padding to rows of the request vector that do not correspond to the user type associated with the request. Thus, in the above example, if the request associated with R1 originates from a user of UserType-1, R1 could be expanded as $$\begin{bmatrix} 1 & 0 & 1 & 0 \\ 0 & 0 & 0 & 0 \\ 0 & 0 & 0 & 0 \end{bmatrix}.$$

Based on the above definitions, the dot product of the rule and request vectors can be used to determine the overall priority of a request, e.g., Rule Vector·Request Vector=Priority Score. Once priority scores have been determined in this manner for each request in an input batch 20, the input batch 20 can be sorted based on request priority. This sorting can be utilized to selectively remove low-priority requests from the input batch 20, e.g., according to the batch refinement technique described above with respect to FIG. 4. Also or alternatively, the priority scores assigned to respective requests can be utilized for other purposes, such as to facilitate dynamic token pruning as described below with respect to FIG. 7, and/or for other purposes.

Figure 7:
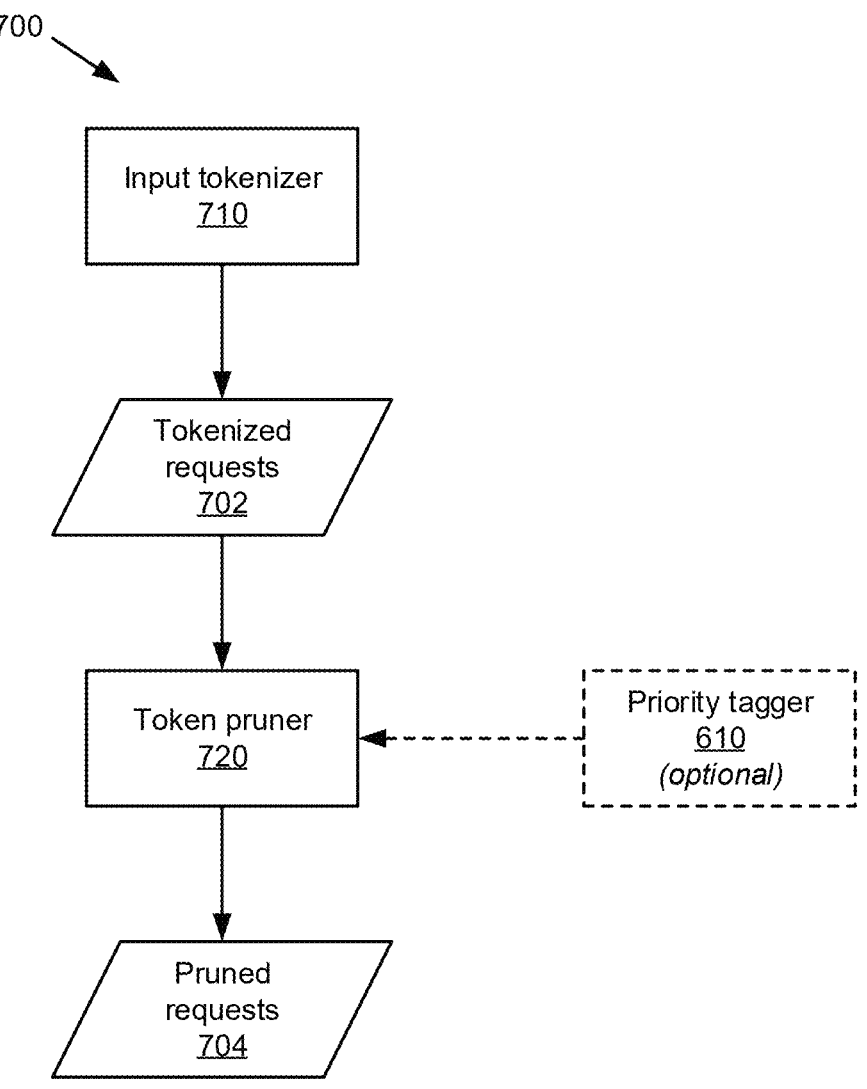

Referring next to FIG. 7, a system 700 that facilitates dynamic attention score pruning of LLM input requests is illustrated. Repetitive description of like parts described above with regard to other implementations is omitted for brevity. System 700 as shown in FIG. 7 includes an input tokenizer 710 that can convert input requests, e.g., input requests of a batch of requests to be processed by an LLM or other model, into a group of input tokens, resulting in tokenized requests 702. System 700 further includes a token pruner 720 that can derive attention scores for respective input tokens of the respective requests, e.g., as described below, and remove, from the input requests, input tokens that are selected by the token pruner 720 as a function of their attention scores, resulting in pruned requests 704. In some implementations as will be described in further detail below, operation of the token pruner 720 can further be guided by priority scores assigned to respective input requests, e.g., via a priority tagger 610 as described above with respect to FIG. 6.

After tokenizing a given input request into tokens representing words and/or phrases in the request, the input tokenizer 710 can determine a weighted scoring W for the request based on its context, e.g., using the same or similar context definitions as those used by the priority tagger 610 as described above with reference to FIG. 6. For instance, if an input represents a generic query or another request context that is likely to be regarded as low-priority by the priority tagger 610, the potential of that query being removed from an input batch during a batch refinement process can be comparatively higher than that of other queries. Accordingly, the corresponding weights can be marked in the query tokens to enable less relevant tokens to be pruned using standard deviation-based processes, e.g., such as that described below. In an implementation, the weighted scoring W of a request can be represented as a matrix diagonal W=diag($r_1, r_2, \ldots, r_n$), where $r_1, r_2, \ldots, r_n$ are the weighted scores for the corresponding tokens.

From the above, a given query can be tokenized and combined with an embedding vector, from which an attention score for the query can be computed. In general, the attention mechanism in transformer-based models can compute a weighted sum of values, where the weights (e.g., attention scores) are derived from the compatibility function between queries and keys. This can be represented as follows:

$$\text{Attention } (Q, K, V) = \text{softmax}\left(\frac{QK^T}{\sqrt{d_k}}\right)V,$$

where Q is the query matrix, K is the key matrix, V is the value matrix, and $d_k$ is the dimensionality of the keys.

In an implementation in which weighted tokens (W) are used, such as those described above, the above attention scoring can be modified as follows:

$$S = \frac{QWK^T}{\sqrt{d_k}}.$$

Based on these definitions, the attention score of a given token can correspond to the estimated relative importance of that token to the context of the query. Thus, for instance, words or phrases that convey the intent of a query (e.g., "data center," "expand storage," etc.) can be given relatively high attention scores, while other words or phrases (e.g., "I would like to," "how do I," etc.) can be given lower attention scores. As such, the token pruner 720 can define a threshold attention score based on a desired amount of tokens to be pruned from a given request, such that the token pruner 720 can prune respective tokens from a given request by comparing the attention scores of the respective tokens of the request to the threshold attention score. This threshold attention score can be an absolute value or a relative value, e.g., such that the token pruner 720 can be configured to prune the X % lowest scoring tokens in the request for some value of X. In the case of a relative threshold value, the percentage X can be a constant percentage (e.g., 25%, 50%, etc.) or a dynamic value, e.g., that is based on the priority score assigned to a request. For instance, a first attention score threshold could be defined for low-priority requests, and a second, higher attention score threshold could be defined for high-priority requests, e.g., such that fewer tokens are pruned from higher priority requests. In other implementations, attention score pruning can be skipped altogether for very high priority input requests, e.g., such that those requests are left entirely intact for LLM processing.

In an implementation, the token pruner 720 can plot the tokenized requests 702 according to their attention scores, e.g., in a bell curve distribution based on a standard deviation of the attention scores. From this distribution, the token pruner 720 can then designate, as the pruned request 704, the attention scored vectors in the peak of the distribution. The token pruner 720 can define an attention score threshold such that the lowest N percent of attention scored vectors from either side of the distribution can be pruned (for some threshold N), which can result in the overall token size being reduced by 2N percent. This can be expressed as follows:

$$S_{pruned} = \begin{cases} S_{ij} & \text{if } S_{ij} \geq \text{threshold} \\ 0 & \text{otherwise} \end{cases}.$$

By pruning requests as shown in FIG. 7, low-priority requests can be pruned in some cases, e.g., as opposed to always dropping them, with negligible impact on request processing accuracy.

Figure 8:
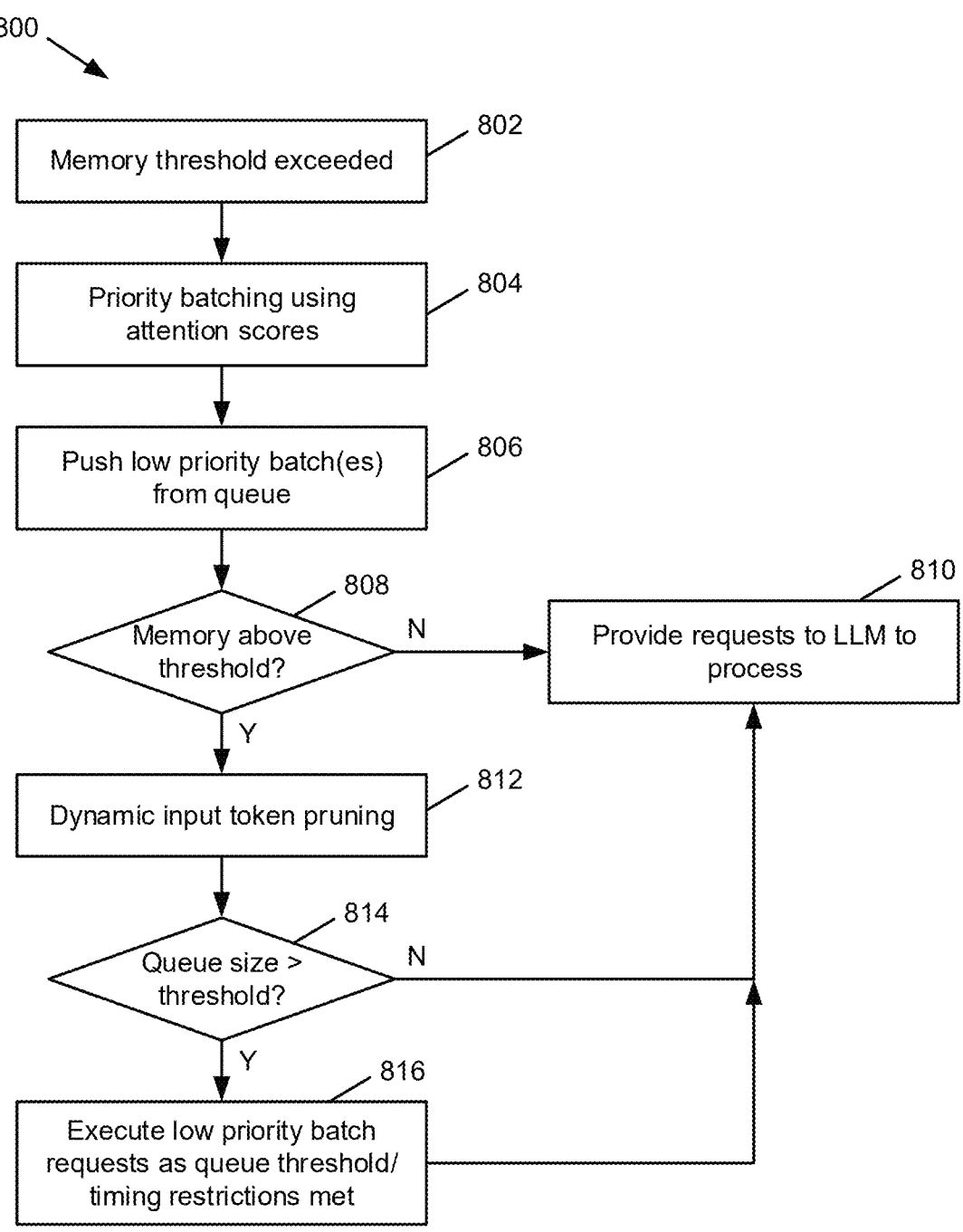
FIG. 8 is a flow diagram of another method that facilitates memory-aware input batch processing for large language models in accordance with various implementations described herein.

To further illustrate the prioritization and pruning processes described above with reference to FIGS. 6-7, FIG. 8 illustrates an example method 800 that can be utilized by systems 600 and/or 700. Method 800 starts at 802, at which it is determined that a memory threshold associated with processing an LLM input batch is exceeded. As a result, at 804, requests can be batched based on their priority levels as well as an attention scoring process, and at 806 a batch of requests determined at 804 to be low priority can be pushed from the LLM input queue.

Next, at 808, the memory usage associated with the remaining input queue can be compared to a memory threshold. If the memory threshold is not exceeded, the queued requests can simply be given to the LLM for processing at 810. Otherwise, method 800 can proceed to 812 to perform dynamic input token pruning, e.g., as described above with respect to FIG. 7.

Following the pruning at 812, method 800 can proceed to 814 to determine whether the queue size for the LLM is greater than a threshold. If the queue size threshold is not exceeded, method 800 can conclude at 810 by providing the queued requests to the LLM for processing. Otherwise, method 800 can proceed to 816, at which low priority batch requests can be executed as the queue threshold allows, before concluding at 810.

Figure 9:
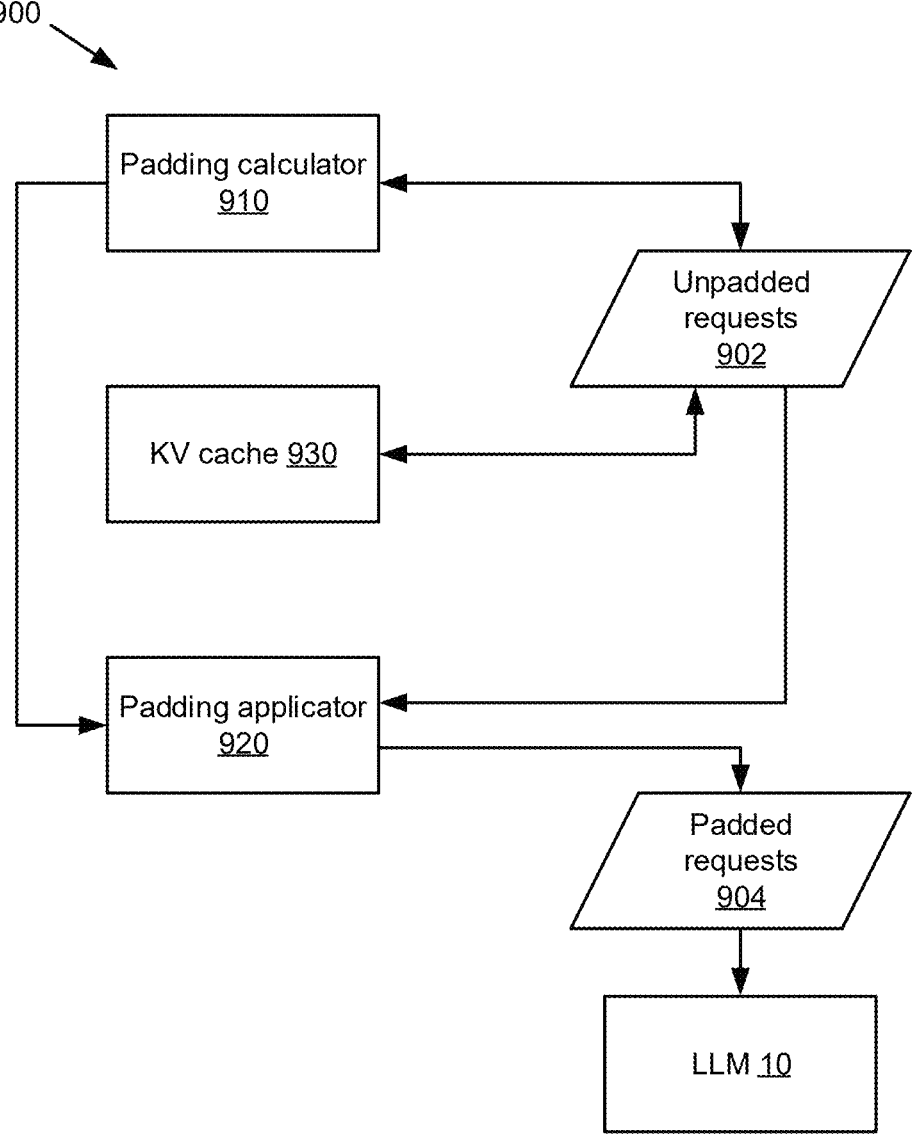
FIG. 9 is a block diagram of still another system that facilitates memory-aware input batch processing for large language models in accordance with various implementations described herein.

Turning now to FIG. 9, a system 900 that facilitates padless caching of LLM input requests is illustrated. Repetitive description of like parts described above with regard to other implementations is omitted for brevity. System 900 as shown in FIG. 9 includes a padding calculator 910 that can determine an amount of padding, e.g., padding tokens, to apply to respective request to be provided to an LLM 10. System 900 further includes a padding applicator 920 that can apply those padding tokens to unpadded requests 902, transforming the unpadded requests 902 into padded requests 904 that can be submitted as part of an input batch to an LLM 10. As further shown in FIG. 9, the unpadded requests 902 can be stored in an intermediate cache, e.g., a key-value (KV) cache 930, prior to padding being applied to the unpadded requests 902 by the padding applicator 920. As will be described in further detail below, caching the unpadded requests 902 and applying padding in response to retrieving the unpadded requests 902 from the KV cache 930 can reduce the memory footprint of a batch of input requests, e.g., by optimizing the amount of padding applied to the padded requests 904.

In an implementation, the unpadded requests 902 shown in FIG. 9 can be tokenized, vectorized, and otherwise processed for LLM processing. In the event that the unpadded requests 902 are of different sequence sizes, the unpadded requests 902 can be padded by the padding applicator 920 before being provided to the LLM 10, e.g., an in implementation in which the LLM 10 requires all requests in a batch to be the same length to facilitate parallel processing of batched requests. The padding applied by the padding applicator 920 can be masked tokens that are ignored by the LLM 10 for processing but are nonetheless needed by the LLM 10 to properly fill processing matrices. In a conventional LLM implementation, requests are padded before loading the requests into the KV cache to facilitate easier computation. However, this can increase the size of the cache, particularly when caching multiple batches and requests.

Accordingly, while tokenizing, the padding calculator 910 can derive the padding numbers for respective unpadded requests 902 without applying the padding during caching. Instead, the padding calculator 910 can provide data relating to the amount of padding to be applied to the respective unpadded requests 902, e.g., numbers of padding tokens or other indicators, to the padding applicator 920, which can then apply the appropriate padding to the unpadded requests 902 as part of the retrieval process from the KV cache 930.

Figure 10:
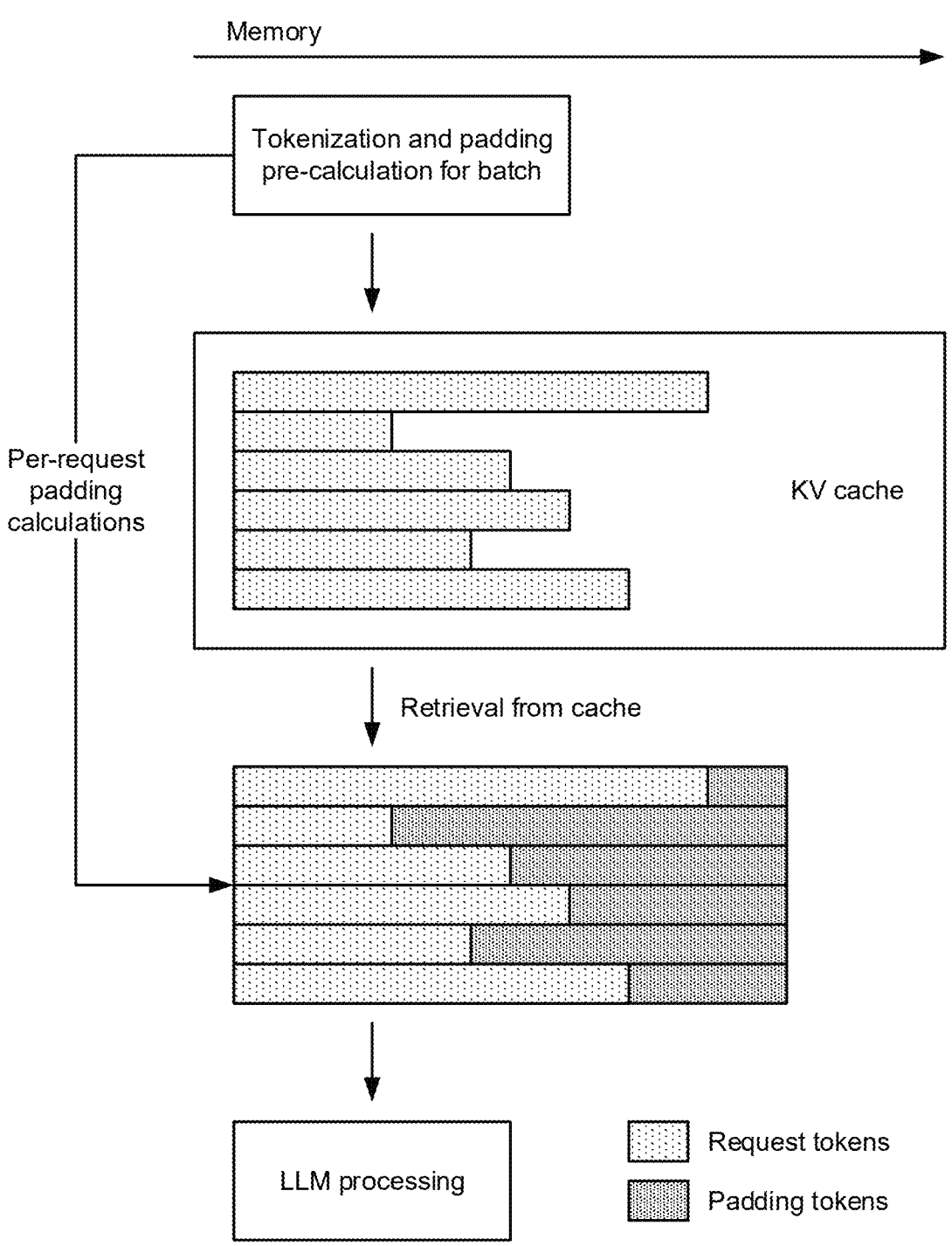
FIGS. 10-12 are diagrams illustrating additional example batch processing operations that can be performed in accordance with various implementations described herein.

An example of padding calculation and application that can be performed by system 900 is shown in FIG. 10. As FIG. 10 illustrates, a group of input requests for an LLM can be tokenized, and during the tokenization process an amount of padding to be applied to each of the requests is pre-calculated. The requests can then be stored in the KV cache without applying the pre-calculated padding. Once the requests are retrieved from the KV cache, the pre-calculated padding can then be applied to the requests just before submitting the batch of requests to the LLM for processing.

With reference again now to FIG. 1, the batch modifier 120 can perform a batch refinement process, e.g., such as that shown in FIG. 4, to modify an input batch 20 to an LLM 10 in the event that the LLM 10 reaches a threshold amount of memory usage processing the input batch 20. By way of non-limiting example, the batch refinement process executed by the batch modifier 120 can proceed as follows:

1) Check if there are any short sequenced requests already completed by the LLM 10 within the input batch 20. If so, remove those requests from the input batch 20 and associated cache(s), and reallocate the memory associated with those requests to other remaining requests.

2) If the memory consumption of the LLM 10 is still above the threshold, tag a portion of the lowest-priority requests (e.g., one-third of the requests, etc.) in the batch.

3) Stop the processing of the tagged requests, remove those requests from the input batch 20 and associated cache(s), and reallocate the memory associated with those requests to other remaining requests.

4) Repeat steps (2) and (3) until the memory consumption of the LLM 10 is below the threshold.

5) Check for newly queued input requests for the LLM 10.

6) Check whether system 100 is configured to preserve request sequence.

7) If system 100 is configured to preserve sequence, include the removed requests from the above steps into the next batch, holding any new requests until process-
ing of the removed requests finishes.

8) If system 100 is not configured to preserve sequence,
batch the removed requests from the above steps into
the next batch along with any new requests.

Other process steps could also be used in addition to, or
in place of, the above.

In an implementation, the process monitor 110 can moni-
tor the memory used by a process in execution at the LLM
10 for processing an input batch 20. In response to deter-
mining that the amount of memory used by the process in
execution exceeds a threshold, the process monitor 110 can
halt the process in execution by the LLM 10, e.g., to enable
the batch modifier 120 to refine the input batch 20 as
described above in response to the process being halted.

In some implementations, the process monitor 110 can
utilize features provided by the LLM 10 in order to halt a
process in execution by the LLM 10. For instance, some
existing LLMs provide a handle to enable halting of pro-
cessing for a specific request identifier. Based on such an
implementation, the process monitor 110 can set a cancel-
ation flag associated with the request identifier in order to
halt processing of a given request. As part of the batch
process utilized by the LLM 10, the cancelation flags for
each request in the input batch 20 can be periodically
checked. If the LLM 10 determines that the cancelation flag
for one or more requests in the batch has been set, processing
for those requests can be halted, and the requests can be
removed from memory at the LLM 10.

Figure 11:
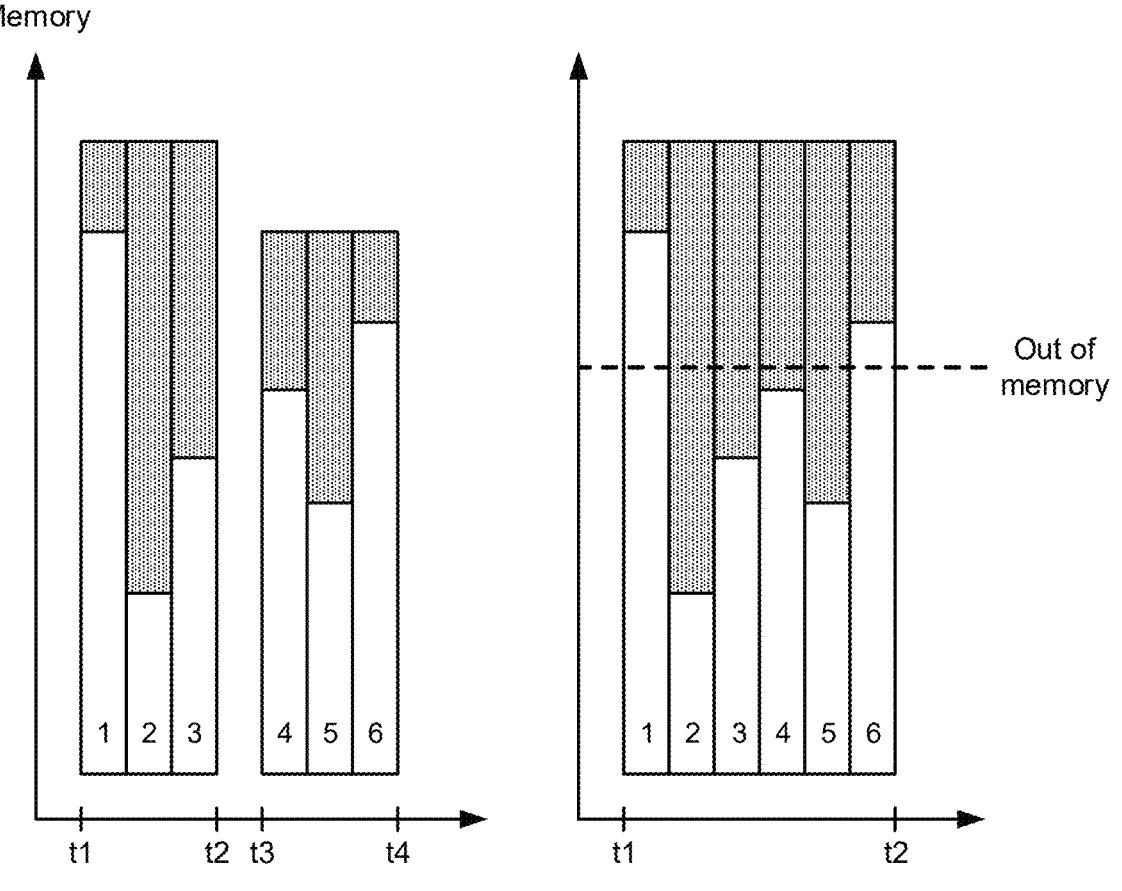
Figure 12:
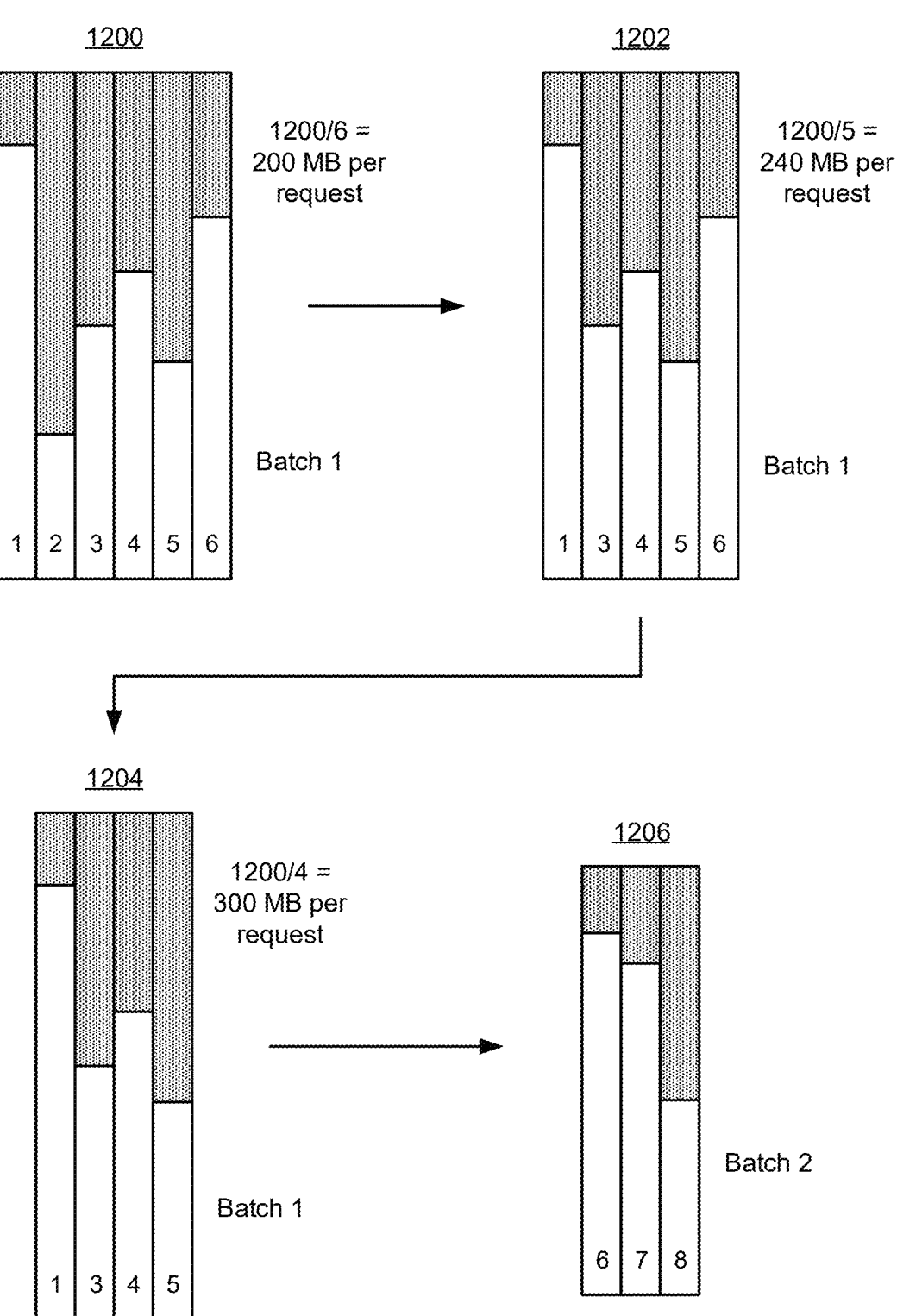

Turning now to FIGS. 11-12, an example batch refinement
process is shown for an example batch of six LLM input
requests, labeled in FIGS. 11-12 as requests 1-6. FIG. 11
illustrates example batch processing operations that can be
performed without batch refinement. FIG. 11 shows that the
six requests can be processed using an optimistic batch size
of three (e.g., two batches of three) or a pessimistic batch
size of six. In the state shown by FIG. 11, setting the batch
size to three results in underutilization of resources as well
as increased processing time due to the presence of a second
batch. However, setting the batch size to six can potentially
result in an out of memory exception that crashes all
requests.

Operations that can be performed to facilitate batch
refinement for the six input requests are shown in FIG. 12.
As shown in FIGS. 11-12, each of the six requests are of
different sequence lengths. For purposes of the example
shown in FIG. 12, the threshold memory usage is set to 80%,
and the batch is not configured to preserve sequence. As a
result of these parameters, an initial input batch can be
formed, as shown by diagram 1200.

Prior to batching, matrix-based priority tagging (e.g., as
described above with respect to FIG. 6) can be performed,
and the requests can be sorted such that they are arranged
from highest to lowest priority. Thus, as shown in diagram
1200, request 1 is the highest priority request while request
6 is the lowest priority request.

Additionally prior to batching, all requests of the batch
can be tokenized, and padding can be applied to the batched
requests, e.g., just before submitting the batch to an LLM for
processing in the manner described above with respect to
FIGS. 9-10. As shown in diagram 1200, the current allocated
memory for the batch is 1200 MB, meaning that each
process in the batch is allocated 1200/6=200 MB of memory.

Next, LLM processing can begin for the batch as shown
in diagram 1200. If the memory usage of the LLM does not
cross the defined threshold (e.g., 80% of available memory),
LLM processing can proceed to completion. However, in the event that the memory consumption crosses the threshold, a
batch refinement process can begin. This process can begin
as shown in diagram 1202, where it can be determined
whether any processes have already been completed by the
LLM prior to the LLM crossing its memory threshold (and
the LLM processing being halted as a result). It is noted that
this could be possible due to the fact that the LLM processes
each request in a batch in parallel, meaning that shorter
requests in the batch could finish before all processing of the
batch completes, even if the LLM does not release any
memory until the full batch is completed. In the example
shown by diagram 1202, request 2 has been completed.
Accordingly, request 2 can be removed from the cache, and
the memory previously allocated to that request can be
reallocated among the remaining requests, e.g., resulting in
an allocation of 1200/5=240 MB of memory per request.

In the event that the memory consumption of the LLM is
still above the defined threshold, batch refinement can
continue as shown in diagram 1204. Here, the system can
look for the lowest priority request in the batch, here request
6 (since the requests are ordered by priority). The process for
request 6 can then be halted, and request 6 can be removed
from the batch and its memory reallocated to other requests
in the batch.

As a result of removing request 6 from the batch, the total
allocation for each remaining request in the batch becomes
1200/4=300 MB of memory per request. In the example
shown by FIG. 12, removing request 6 results in the LLM
memory consumption falling to below the threshold, and
processing for the batch successfully concludes.

As further shown in diagram 1206, during the processing
time of the initial batch, two additional requests, denoted as
requests 7 and 8, can also arrive. Because the system is
configured not to preserve request sequence, previously
removed request 6 can be added into a subsequent batch
along with the newly arrived requests. Priority tagging and
other processes as described above can then be performed
for the new batch of requests prior to processing of the batch
by the LLM. In the event that the LLM does not cross the
memory threshold for the subsequent batch, processing of
the batch can conclude without performing further actions.

Referring now to FIG. 13, a flow diagram of a method
1300 that facilitates memory-aware input batch processing
for LLMs is illustrated. At 1302, a system comprising at
least one processor can monitor (e.g., via a process monitor
110) an amount of memory, utilized by a process in execu-
tion by a language model (e.g., an LLM 10) in association
with processing a first batch of prompts (e.g., an input batch
20), relative to an available amount of memory for the
process in execution.

At 1304, the system can remove (e.g., by a batch modifier
120), in response to determining that the amount of memory
utilized by the process in execution is at least a threshold
proportion of the available amount of memory, at least one
prompt from the first batch of prompts according to a
priority criterion, resulting in a second batch of prompts.

At 1306, the system can facilitate (e.g., by a model
initiator 130), in response to the removing at 1304, restarting
the process in execution with the second batch of prompts
instead of the first batch of prompts.

Referring next to FIG. 14, a flow diagram of a method
1400 that can be performed by at least one processor, e.g.,
based on machine-executable instructions stored on a non-
transitory machine-readable medium, is illustrated. An
example of a computer architecture, including a processor
and non-transitory media, that can be utilized to implement
method 1400 is described below with respect to FIG. 15.

Method 1400 can begin at 1402, in which the at least one processor can monitor an amount of memory, utilized by a process in execution by a machine learning model in association with processing first batched input requests, relative to an available amount of memory for the process in execution.

At 1404, in response to determining that the amount of memory utilized by the process in execution is at least a threshold amount of the available amount of memory, the at least one processor can remove at least one input request from the first batched input requests, according to a priority criterion, resulting in second batched input requests.

At 1406, the at least one processor can restart, in response to the removing at 1404, the process in execution with the second batched input requests instead of the first batched input requests.

FIGS. 3-4, 8, and 13-14 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 15:
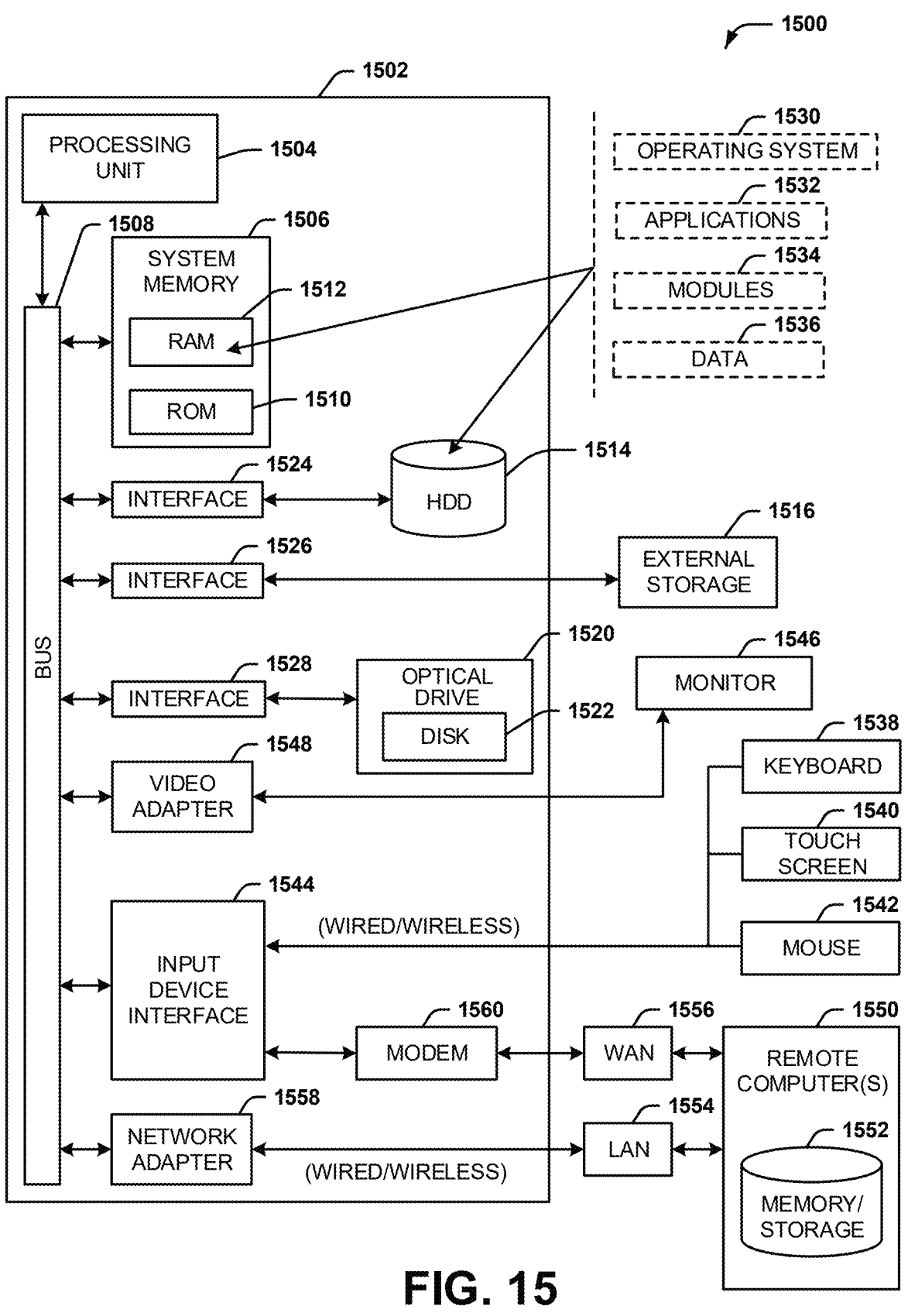
FIG. 15 is a diagram of an example computing environment in which various implementations described herein can function.

In order to provide additional context for various embodiments described herein, FIG. 15 and the following discussion are intended to provide a brief, general description of a suitable computing environment 1500 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 15, an example general-purpose environment 1500 for implementing various embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD), a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, the operations comprising:

monitoring an amount of memory, utilized by a process in execution by a large language model in association with processing a first batch of input requests, relative to an available amount of memory for the process in execution;

in response to determining that the amount of memory utilized by the process in execution is at least a threshold percentage of the available amount of memory, removing at least one input request from the first batch of input requests according to a priority criterion, resulting in a second batch of input requests; and restarting, in response to the removing, the process in execution with the second batch of input requests instead of the first batch of input requests.

2. The system of claim 1, wherein the operations further comprise:

assigning priority scores to input requests, of the first batch of input requests, wherein the priority criterion is based on a result of comparing the priority scores to a threshold priority value.

3. The system of claim 2, wherein the assigning of the priority scores comprises assigning the priority scores based on at least one factor selected from a group of factors comprising respective originators of the input requests and respective contexts of the input requests.

4. The system of claim 1, wherein the operations further comprise:

applying padding tokens to input requests, of the first batch of input requests, resulting in the input requests having a uniform length; and submitting, in response to the applying of the padding tokens being determined to have successfully completed, the first batch of input requests to the large language model.

5. The system of claim 4, wherein the operations further comprise:

determining amounts of padding tokens to apply to respective ones of the input requests;

storing the input requests in an intermediate cache prior to the applying of the padding tokens; and retrieving the input requests from the intermediate cache prior to the submitting of the first batch of input requests, wherein the applying of the padding tokens is in response to the retrieving.

6. The system of claim 1, wherein the operations further comprise:

converting an input request, of the first batch of input requests, to a group of input tokens;

deriving attention scores for respective ones of the group of input tokens; and removing, from the input request, selected input tokens of the group of input tokens, the selected input tokens being selected as a function of the attention scores.

7. The system of claim 6, wherein the function of the attention scores comprises comparing an attention score, of the attention scores, to a threshold attention score, the threshold attention score being assigned based on the priority criterion.

8. The system of claim 1, wherein the operations further comprise:

in further response to determining that the amount of memory utilized by the process in execution is at least the threshold percentage of the available amount of memory, halting the process in execution by the large language model, wherein the removing of the at least one input request from the first batch of input requests is in response to the halting of the process.

9. The system of claim 8, wherein the removing of the at least one input request from the first batch of input requests is in response to determining that the large language model completed processing of the at least one input request prior to the halting of the process.

10. The system of claim 1, wherein the operations further comprise:

adding the at least one input request removed from the first batch of input requests to a third batch of input requests to be processed by the large language model after the second batch of input requests.

11. A method, comprising:

monitoring, by a system comprising at least one processor, an amount of memory, utilized by a process in execution by a language model in association with processing a first batch of prompts, relative to an available amount of memory for the process in execution;

in response to determining that the amount of memory utilized by the process in execution is at least a threshold proportion of the available amount of memory, removing, by the system, at least one prompt from the first batch of prompts according to a priority criterion, resulting in a second batch of prompts; and facilitating, by the system in response to the removing, restarting the process in execution with the second batch of prompts instead of the first batch of prompts.

12. The method of claim 11, further comprising:

assigning, by the system, priority scores to prompts, of the first batch of prompts, wherein the priority criterion is based on a result of comparing the priority scores to a threshold priority value.

13. The method of claim 11, further comprising:

converting, by the system, a prompt, of the first batch of prompts, to a group of input tokens;

deriving, by the system, attention scores for respective ones of the group of input tokens; and removing, by the system, selected input tokens of the group of input tokens from the prompt, the selected input tokens being selected as a function of the attention scores.

14. The method of claim 11, further comprising in further response to determining that the amount of memory utilized by the process in execution is at least the threshold proportion of the available amount of memory, halting, by the system, the process in execution by the language model, wherein the removing of the at least one prompt from the first batch of prompts is in response to the halting.

15. The method of claim 14, wherein the removing of the at least one prompt from the first batch of prompts is in response to determining that the language model completed processing of the at least one prompt prior to the halting.

16. A non-transitory machine-readable medium comprising computer executable instructions that, when executed by at least one processor, facilitate performance of operations, the operations comprising:

monitoring an amount of memory, utilized by a process in execution by a machine learning model in association with processing first batched input requests, relative to an available amount of memory for the process in execution;

in response to determining that the amount of memory utilized by the process in execution is at least a threshold amount of the available amount of memory, removing at least one input request from the first batched input requests, according to a priority criterion, resulting in second batched input requests; and restarting, in response to the removing, the process in execution with the second batched input requests instead of the first batched input requests.

17. The non-transitory machine-readable medium of claim 16, wherein the operations further comprise:

assigning priority scores to input requests, of the first batched input requests, wherein the priority criterion is a function of a result of comparing the priority scores to a priority threshold.

18. The non-transitory machine-readable medium of claim 16, wherein the operations further comprise:

converting an input request, of the first batched input requests, to a group of input tokens;

determining attention scores for respective ones of the group of input tokens; and removing selected input tokens, of the group of input tokens, from the input request, the selected input tokens being selected as a function of the attention scores.

19. The non-transitory machine-readable medium of claim 16, wherein the operations further comprise:

in further response to determining that the amount of memory utilized by the process in execution is at least the threshold amount of the available amount of memory, halting the process in execution by the machine learning model, wherein the removing of the at least one input request from the first batched input requests is in response to the halting.

20. The non-transitory machine-readable medium of claim 19, wherein the removing of the at least one input request from the first batched input requests is in response to determining that the machine learning model completed processing of the at least one input request prior to the halting.

\* \* \* \* \*